(12) United States Patent
Zhang et al.

(10) Patent No.: US 8,917,794 B2
(45) Date of Patent: Dec. 23, 2014

(54) METHOD, TERMINAL, AND SYSTEM FOR SENDING AND RECEIVING SERVICE INFORMATION

(71) Applicant: Huawei Technologies Co., Ltd., Shenzhen, Guangdong (CN)

(72) Inventors: Xuekun Zhang, Chengdu (CN); Rui Chen, Chengdu (CN); Cheng Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/629,393

(22) Filed: Sep. 27, 2012

(65) Prior Publication Data

US 2013/0022093 A1    Jan. 24, 2013

Related U.S. Application Data

(63) Continuation of application No. PCT/CN2011/072146, filed on Mar. 30, 2011.

(30) Foreign Application Priority Data

Mar. 31, 2010    (CN) .......................... 2010 1 0136924

(51) Int. Cl.
*H04L 27/00* (2006.01)
*H04L 1/00* (2006.01)

(52) U.S. Cl.
CPC ............ *H04L 1/0003* (2013.01); *H04L 1/0009* (2013.01); *H04L 1/0016* (2013.01)
USPC ........... 375/295; 375/219; 375/340; 370/329; 370/332

(58) Field of Classification Search
CPC ....................................................... H04B 1/40
USPC ........................................................ 375/295
See application file for complete search history.

(56) References Cited

U.S. PATENT DOCUMENTS

| | | | | |
|---|---|---|---|---|
| 6,049,672 | A | * | 4/2000 | Shiell et al. .................. 717/168 |
| 2005/0226182 | A1 | * | 10/2005 | Itoh ............................... 370/329 |

FOREIGN PATENT DOCUMENTS

| | | |
|---|---|---|
| CN | 2762441 Y | 3/2006 |
| CN | 101567772 A | 10/2009 |
| CN | 101674149 A | 3/2010 |
| CN | 101826938 A | 9/2010 |

OTHER PUBLICATIONS

Written Opinion of the International Searching Authority dated Jul. 7, 2011 in connection with International Patent Application No. PCT/CN2011/072146.
International Search Report dated Jul. 7, 2011 in connection with International Patent Application No. PCT/CN2011/072146.

* cited by examiner

*Primary Examiner* — Lihong Yu

(57) ABSTRACT

A method for sending service information includes: judging whether a current ACM profile identifier (profile ID) is consistent with an ACM profile ID recorded in separately-stored coding and modulation information; when the current ACM profile ID is consistent with the ACM profile ID recorded in the separately-stored coding and modulation information, coding and modulating the service information according to the coding and modulation information; when the current ACM profile ID is inconsistent with the ACM profile ID recorded in the separately-stored coding and modulation information, coding and modulating the service information according to an ACM profile table; and sending the coded and modulated service information, where the coded and modulated service information carries the current ACM profile ID.

9 Claims, 12 Drawing Sheets

METHOD, TERMINAL, AND SYSTEM FOR SENDING AND RECEIVING SERVICE INFORMATION

CROSS-REFERENCE TO RELATED APPLICATIONS

This application is a continuation of International Application No. PCT/CN2011/072146, filed on Mar. 30, 2011, which claims priority to Chinese Patent Application No. 201010136924.6, filed on Mar. 31, 2010, both of which are hereby incorporated by reference in their entireties.

FIELD OF THE INVENTION

The present invention relates to the field of communication technologies, and in particular, to a method, a terminal, and a system for sending and receiving service information.

BACKGROUND

The adaptive coding and modulation ACM (Adaptive Coding and Modulation) technology is a transmission technology having a channel-adaptive feature and is established on the basis of channel estimation. Availability of an air interface link is estimated in real time by using a detection mechanism of a receiving end, and an indication for switching a modulation and coding scheme is automatically generated; and then, the switching indication is fed back to a sending end through a feedback channel, and the sending end automatically changes the modulation and coding scheme of a service according to the switching indication, thus realizing a tradeoff between system capacity and anti-interference capability of a system, maximizing overall transmission performance of the system, and achieving an objective of efficient and reliable transmission.

As shown in FIG. 1A and FIG. 1B, a conventional method for transmitting service information is provided. In the method for transmitting service information, a same adaptive coding and modulation profile table (ACM profile table) needs to be configured for the sending end and the receiving end. The ACM profile table includes multiple (such as 16) ACM profile identifiers (profile IDs). Each profile ID corresponds to a modulation and coding scheme, and different modulation and coding schemes correspond to different transmission reliability and transmission efficiency.

It can be known from FIG. 1A and FIG. 1B that, when ACM information is transmitted between the sending end and the receiving end, in order to save bandwidth, generally only a profile ID (such as profile ID 0) is transmitted. In this way, first service information to be sent is modulated and coded at the sending end according to a modulation and coding scheme corresponding to a profile ID in the ACM profile table, and then, the modulated and coded service information is sent to the receiving end together with the profile ID information. At the receiving end, the profile ID information is extracted, and a corresponding modulation and coding scheme is searched in the ACM profile table according to the profile ID, and finally, the service information is demodulated and decoded according to the modulation and coding scheme, thus obtaining needed service information.

However, in the procedure of implementing the foregoing process, the inventor finds that the prior art has at least the following problems:

Because the sending end and the receiving end use the same ACM profile table, if the ACM profile table of the sending end and the ACM profile table of the receiving end need to be updated, the ACM profile table of the sending end and the ACM profile table of the receiving end need to be switched strictly synchronously to ensure that the service in transmission is not interrupted. Otherwise, when the ACM profile table at the sending end is switched while the ACM profile table at the receiving end remains unchanged, because modulation and coding schemes corresponding to a same profile ID in the ACM profile tables may be different, the receiving end cannot demodulate and decode the service information, thus causing an interruption of the service.

SUMMARY

Embodiments of the present invention provide a method, a terminal, and a system for sending and receiving service information, so that ACM profile tables may be switched asynchronously between sending and receiving the service information, thus ensuring that a service in transmission is not interrupted.

To achieve the foregoing objective, the embodiments of the present invention adopt the following technical solutions:

A method for sending service information includes:

receiving a current ACM profile ID;

judging whether the current ACM profile ID is consistent with an ACM profile ID recorded in separately-stored coding and modulation information, where the coding and modulation information records an ACM profile ID used for successfully sending service information last time and a corresponding coding and modulation scheme;

when the current ACM profile ID is consistent with the ACM profile ID recorded in the separately-stored coding and modulation information, coding and modulating the service information according to the coding and modulation scheme recorded in the coding and modulation information;

when the current ACM profile ID is inconsistent with the ACM profile ID recorded in the separately-stored coding and modulation information, searching and invoking a coding and modulation scheme corresponding to the current ACM profile ID from an ACM profile table, and coding and modulating the service information according to the invoked coding and modulation scheme; and sending the coded and modulated service information, where the coded and modulated service information carries the current ACM profile ID.

A method for receiving service information includes:

receiving service information carrying a current ACM profile ID;

judging whether the current ACM profile ID is consistent with an ACM profile ID recorded in separately-stored demodulation and decoding information, where the demodulation and decoding information records an ACM profile ID used for successfully receiving service information last time and a corresponding demodulation and decoding scheme;

when the current ACM profile ID is consistent with the ACM profile ID recorded in the separately-stored demodulation and decoding information, demodulating and decoding the service information according to the demodulation and decoding scheme recorded in the demodulation and decoding information; and when the current ACM profile ID is inconsistent with the ACM profile ID recorded in the separately-stored demodulation and decoding information, searching and invoking a demodulation and decoding scheme corresponding to the current ACM profile ID from an ACM profile table, and demodulating and decoding the service information according to the invoked demodulation and decoding scheme.

A terminal for sending service information includes:

a receiving unit, configured to receive a current ACM profile ID;

a judging unit, configured to judge whether the current ACM profile ID is consistent with an ACM profile ID recorded in separately-stored coding and modulation information, where the coding and modulation information records an ACM profile ID used for successfully sending service information last time and a corresponding coding and modulation scheme;

a coding and modulating unit, configured to, when the current ACM profile ID is consistent with the ACM profile ID recorded in the separately-stored coding and modulation information, code and modulate the service information according to the coding and modulation scheme recorded in the coding and modulation information, or when the current ACM profile ID is inconsistent with the ACM profile ID recorded in the separately-stored coding and modulation information, search and invoke a coding and modulation scheme corresponding to the current ACM profile ID from an ACM profile table, and code and modulate the service information according to the invoked coding and modulation scheme; and a sending unit, configured to send the coded and modulated service information, where the coded and modulated service information carries the current ACM profile ID.

A terminal for receiving service information includes:

a receiving unit, configured to receive service information carrying a current ACM profile ID;

a judging unit, configured to judge whether the current ACM profile ID is consistent with an ACM profile ID recorded in separately-stored demodulation and decoding information, where the demodulation and decoding information records an ACM profile ID used for successfully receiving service information last time and a corresponding demodulation and decoding scheme; and a demodulating and decoding unit, configured to, when the current ACM profile ID is consistent with the ACM profile ID recorded in the separately-stored demodulation and decoding information, demodulate and decode the service information according to the demodulation and decoding scheme recorded in the demodulation and decoding information, or when the current ACM profile ID is inconsistent with the ACM profile ID recorded in the separately-stored demodulation and decoding information, search and invoke a demodulation and decoding scheme corresponding to the current ACM profile ID from an ACM profile table, and demodulate and decode the service information according to the invoked demodulation and decoding scheme.

A system for receiving and sending service information includes:

a terminal for sending service information, configured to receive a current ACM profile ID; judge whether the current ACM profile ID is consistent with an ACM profile ID recorded in separately-stored coding and modulation information, where the coding and modulation information records an ACM profile ID used for successfully sending service information last time and a corresponding coding and modulation scheme; when the current ACM profile ID is consistent with the ACM profile ID recorded in the separately-stored coding and modulation information, code and modulate the service information according to the coding and modulation scheme recorded in the coding and modulation information, or when the current ACM profile ID is inconsistent with the ACM profile ID recorded in the separately-stored coding and modulation information, search and invoke a coding and modulation scheme corresponding to the current ACM profile ID from an ACM profile table, and code and modulate the service information according to the invoked coding and modulation scheme; and finally send the coded and modulated service information, where the coded and modulated service information carries the current ACM profile ID; and a terminal for receiving service information, configured to receive the service information carrying the current ACM profile ID; judge whether the current ACM profile ID is consistent with an ACM profile ID recorded in separately-stored demodulation and decoding information, where the demodulation and decoding information records an ACM profile ID used for receiving service information last time and a corresponding demodulation and decoding scheme; when the current ACM profile ID is consistent with the ACM profile ID recorded in the separately-stored demodulation and decoding information, demodulate and decode the service information according to the demodulation and decoding scheme recorded in the demodulation and decoding information, or when the current ACM profile ID is inconsistent with the ACM profile ID recorded in the separately-stored demodulation and decoding information, search and invoke a demodulation and decoding scheme corresponding to the current ACM profile ID from an ACM profile table, and demodulate and decode the service information according to the invoked demodulation and decoding scheme.

In the method, terminal, and system for sending and receiving service information according to the embodiments of the present invention, when the current ACM profile ID is consistent with the ACM profile ID recorded in the coding and modulation information (or in the demodulation and decoding information), the service information is coded and modulated (or demodulated and decoded) according to the coding and modulation scheme (or the demodulation and decoding scheme) recorded in the coding and modulation information (or recorded in the demodulation and decoding information) without the need to access the ACM profile table. Therefore, the current ACM profile ID can be locked, and thus the ACM profile tables for receiving and sending service information may be switched asynchronously during a locking period.

BRIEF DESCRIPTION OF THE DRAWINGS

To make the technical solutions of the embodiments of the present invention or the prior art clearer, accompanying drawings used in the description of the embodiments or the prior art are briefly described below. Evidently, the accompanying drawings in the following description are only some embodiments of the present invention, and persons of ordinary skill in the art may further obtain other drawings according to these accompanying drawings without creative efforts.

DETAILED DESCRIPTION

A method, a terminal, and a system for sending and receiving service information according to the embodiments of the present invention are described in detail below with reference to the accompanying drawings.

It should be noted that the embodiments to be described are only part of rather than all of the embodiments of the present invention. All other embodiments that persons of ordinary skill in the art obtain without creative efforts based on the embodiments of the present invention also fall within the scope of the present invention.

Figure 1A:
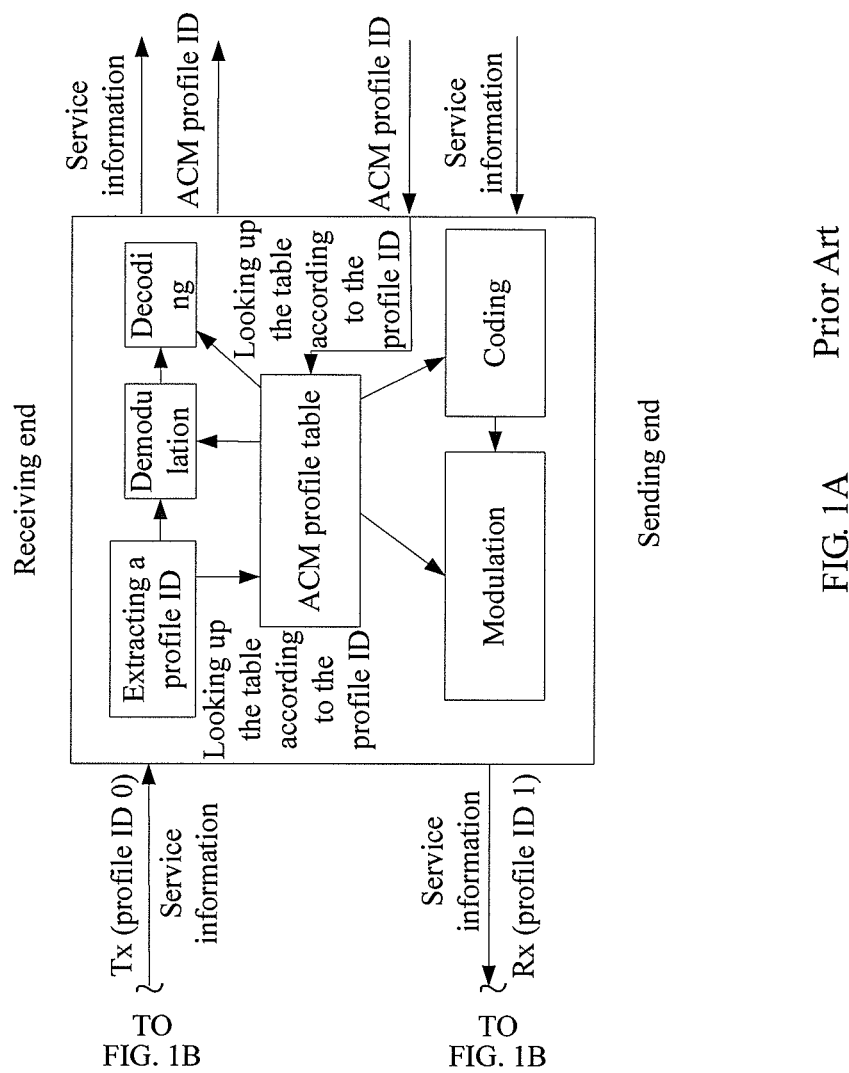
FIG. 1A and FIG. 1B are a schematic diagram of a method for transmitting service information in the prior art.
Figure 1B:
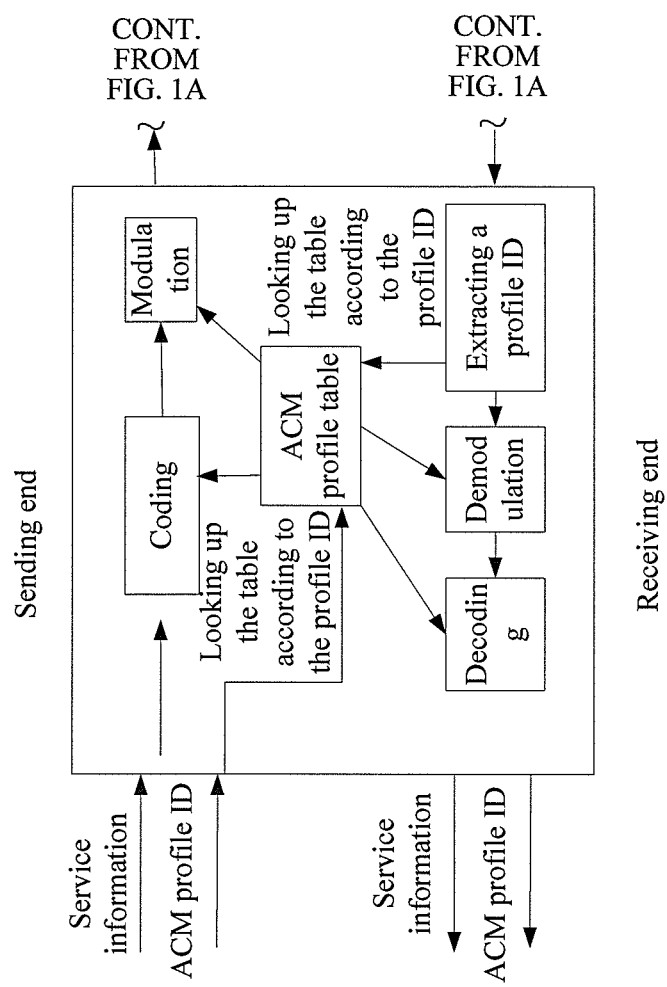
Figure 2:
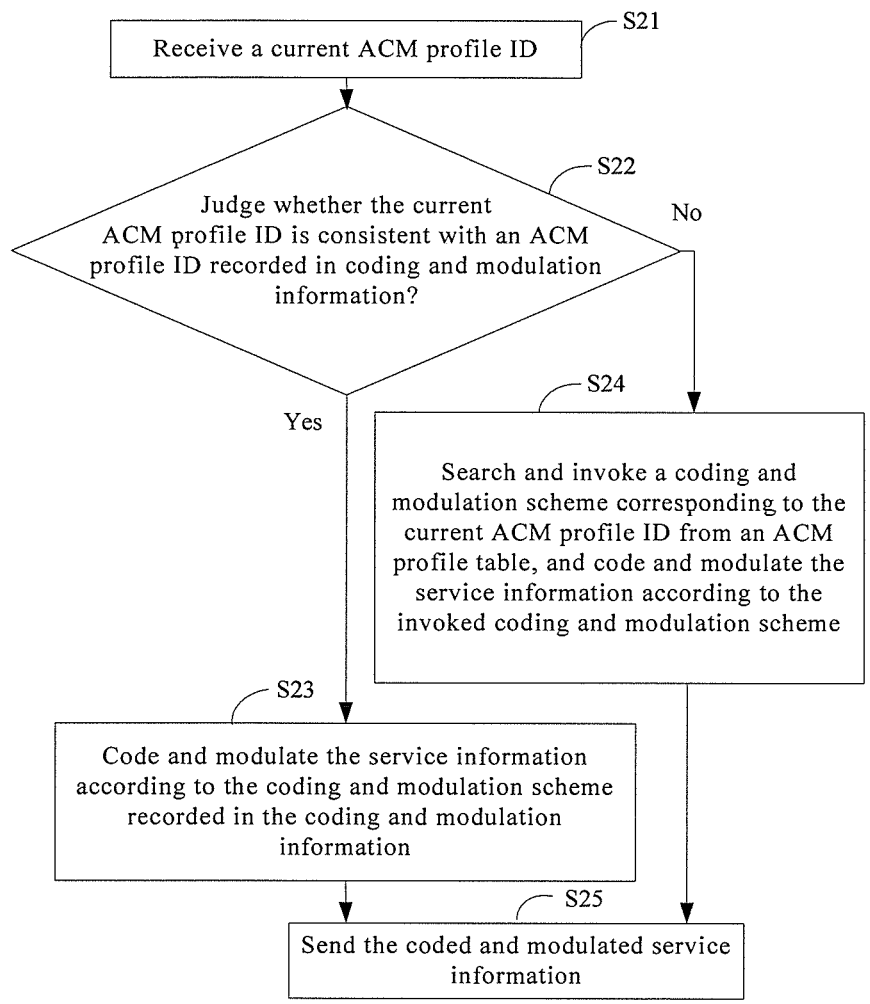
FIG. 2 is a schematic diagram of a method for sending service information according to an embodiment of the present invention.

As shown in FIG. 2, an embodiment of the present invention provides a method for sending service information, where the method includes:

S21: Receive a current ACM profile ID.

S22: Judge whether the current ACM profile ID is consistent with an ACM profile ID recorded in separately-stored coding and modulation information, where the coding and modulation information records an ACM profile ID used for successfully sending service information last time and a corresponding coding and modulation scheme.

S23: When the current ACM profile ID is consistent with the ACM profile ID recorded in the separately-stored coding and modulation information, code and modulate the service information according to the coding and modulation scheme recorded in the coding and modulation information.

S24: When the current ACM profile ID is inconsistent with the ACM profile ID recorded in the separately-stored coding and modulation information, search and invoke a coding and modulation scheme corresponding to the current ACM profile ID from an ACM profile table (ACM profile table), and code and modulate the service information according to the invoked coding and modulation scheme.

S25: Send the coded and modulated service information, where the coded and modulated service information carries the current ACM profile ID.

Figure 3:
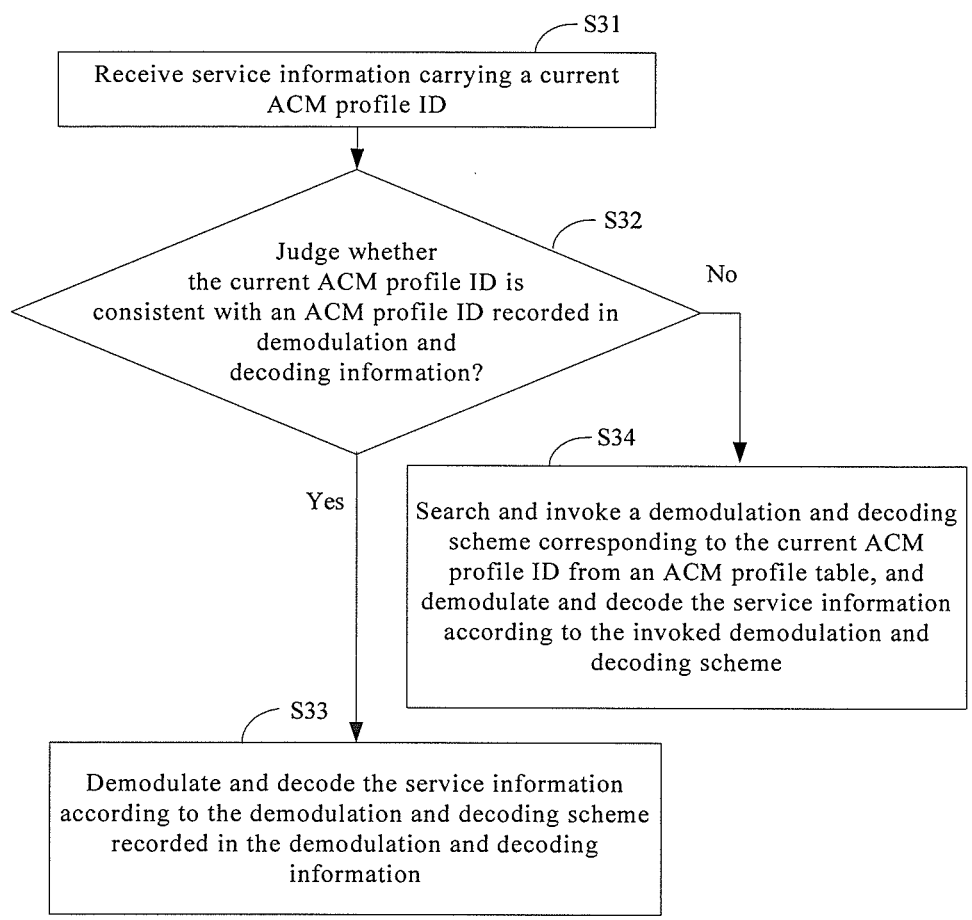
FIG. 3 is a schematic diagram of a method for receiving service information according to an embodiment of the present invention.

As shown in FIG. 3, an embodiment of the present invention provides a method for receiving service information, where the method includes:

S31: Receive service information carrying a current ACM profile ID.

S32: Judge whether the current ACM profile ID is consistent with an ACM profile ID recorded in separately-stored demodulation and decoding information, where the demodulation and decoding information records an ACM profile ID used for successfully receiving service information last time and a corresponding demodulation and decoding scheme.

S33: When the current ACM profile ID is consistent with the ACM profile ID recorded in the separately-stored demodulation and decoding information, demodulate and decode the service information according to the demodulation and decoding scheme recorded in the demodulation and decoding information.

S34: When the current ACM profile ID is inconsistent with the ACM profile ID recorded in the separately-stored demodulation and decoding information, search and invoke a demodulation and decoding scheme corresponding to the current ACM profile ID from an ACM profile table, and demodulate and decode the service information according to the invoked demodulation and decoding scheme.

In the method, terminal, and system for sending and receiving service information according to the embodiments of the present invention, when the current ACM profile ID is consistent with the ACM profile ID recorded in the coding and modulation information (or in the demodulation and decoding information), the service information is coded and modulated (or demodulated and decoded) according to the coding and modulation scheme (or the demodulation and decoding scheme) recorded in the coding and modulation information (or recorded in the demodulation and decoding information) without the need to access the ACM profile table. Therefore, the current ACM profile ID can be locked, and thus the ACM profile tables for receiving and sending service information may be switched asynchronously during a locking period.

Figure 4:
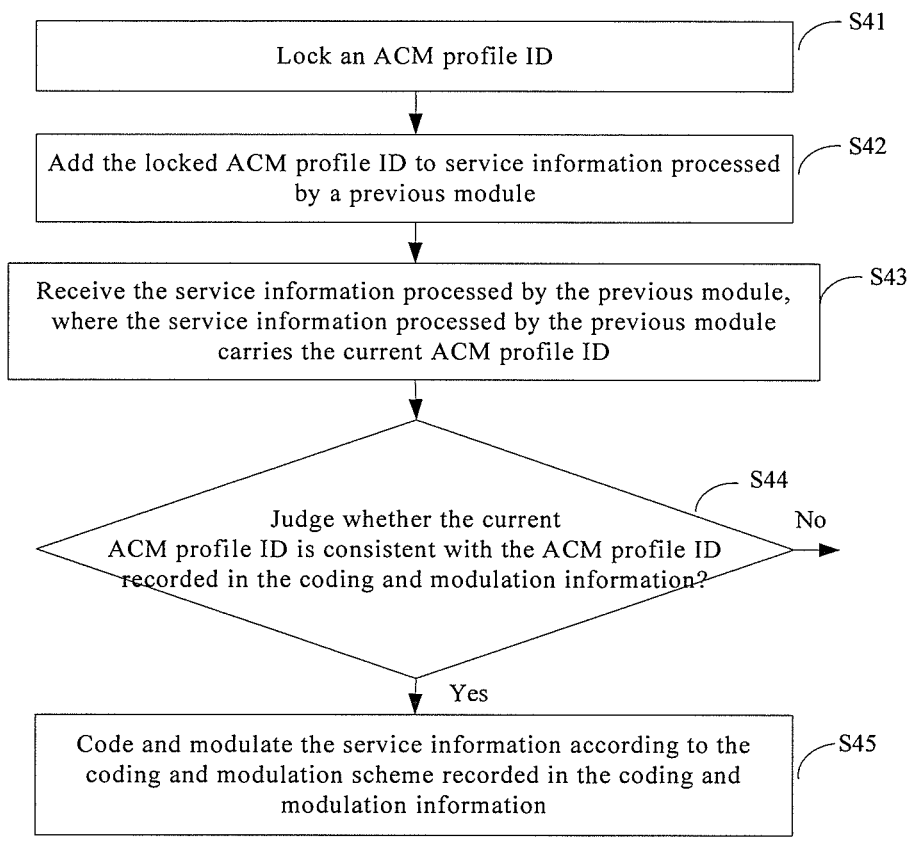
FIG. 4 is a detailed schematic diagram of the method for sending service information as shown in FIG. 2.

As shown in FIG. 4, a method for sending service information under a circumstance where an ACM profile ID is locked according to this embodiment is described in detail below. The method includes:

S41: Lock an ACM profile ID.

This ACM profile ID needs to be the same as an ACM profile ID used for sending service information last time. For example, the last ACM profile ID may be profile ID 0. The profile ID 0 is used as the current ACM profile ID after being locked, and a coding and modulation scheme corresponding to the profile ID 0 is continuously used for a time period to code and modulate the service information. The time period may be a time period for a terminal for sending service information and a terminal for receiving service information to switch ACM profile tables.

S42: Add the locked ACM profile ID to service information processed by a previous module.

In this way, the locked ACM profile ID 0 can be transmitted together with the service information processed by the previous module.

S43: Receive the service information processed by the previous module, where the service information processed by the previous module carries the current ACM profile ID 0.

S44: Judge whether the current ACM profile ID 0 is consistent with an ACM profile ID recorded in coding and modulation information, where the coding and modulation information records an ACM profile ID used for successfully sending service information last time and a corresponding coding and modulation scheme.

The coding and modulation information may be separately stored in a set of registers. And the coding and modulation information only records information such as one ACM profile ID and a coding and modulation scheme corresponding to the ACM profile ID. It can be known from the foregoing that, the ACM profile ID used for successfully sending service information last time in this embodiment is the profile ID 0. And, after the ACM profile ID is locked, the current ACM profile ID is also the profile ID 0. In this way, by comparing the current ACM profile ID and the ACM profile ID recorded in the coding and modulation information, it can be known that the current ACM profile ID is consistent with the ACM profile ID recorded in the coding and modulation information.

S45: Because a judging result in step S44 is that the current ACM profile ID is consistent with the ACM profile ID recorded in the coding and modulation information, code and modulate the service information according to the coding and modulation scheme recorded in the coding and modulation information, that is, according to the coding and modulation scheme corresponding to the profile ID 0.

S46: Send the coded and modulated service information.

The coded and modulated service information carries the current ACM profile ID, so that the terminal for receiving service information demodulates and decodes the service information according to the current ACM profile ID.

Figure 5:
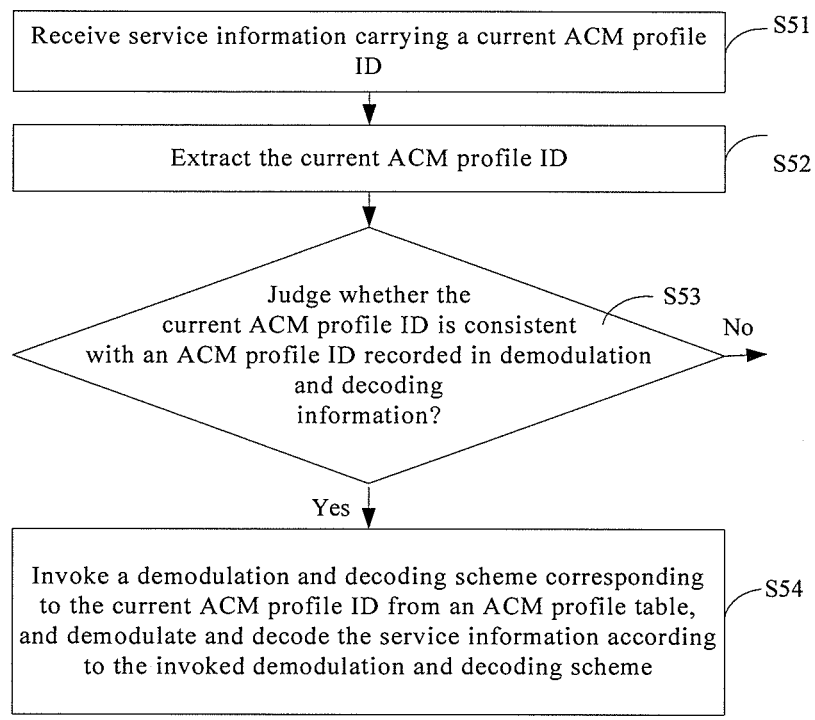
FIG. 5 is a detailed schematic diagram of the method for receiving service information as shown in FIG. 3.

As shown in FIG. 5, a method for receiving service information under a circumstance where an ACM profile ID is locked according to this embodiment is described in detail below. The method includes:

S51: Receive service information carrying a current ACM profile ID.

The current ACM profile ID is a locked ACM profile ID, that is, profile ID 0.

S52: Extract the current ACM profile ID.

The current ACM profile ID is extracted from the service information to complete subsequent operation procedures, such as demodulation and decoding.

S53: Judge whether the current ACM profile ID is consistent with an ACM profile ID recorded in separately-stored demodulation and decoding information, where the demodulation and decoding information records an ACM profile ID used for successfully receiving service information last time and a corresponding demodulation and decoding scheme.

The demodulation and decoding information may be separately stored in a set of registers. And the demodulation and decoding information only records information such as one ACM profile ID and a demodulation and decoding scheme corresponding to the ACM profile ID. It should be noted that the information recorded in the demodulation and decoding information described in this embodiment should be the same as the information recorded in the coding and modulation information in the embodiment as shown in FIG. 4, so that the received service information can be demodulated and decoded smoothly. It can be known that, after the ACM profile ID is locked, the current ACM profile ID is consistent with the ACM profile ID recorded in the demodulation and decoding information.

S54: Because a judging result in step S53 is that the current ACM profile ID is consistent with the ACM profile ID recorded in the demodulation and decoding information, demodulate and decode the service information according to the demodulation and decoding scheme recorded in the demodulation and decoding information, that is, according to the demodulation and decoding scheme corresponding to the profile ID 0.

In a communication system, a transmission device is generally located in a service bearer layer and needs to support a large number of long-term stable upper-layer services. After a service supported by the transmission device is activated, if a configuration needs to be modified (such as switching an ACM profile table), an operator generally hopes that existing services are not affected or that an impact on the existing services is minimized.

It can be known from the embodiments shown in FIG. 4 and FIG. 5 that, during the period when the ACM profile ID is locked, because the locked ACM profile ID is the same as the ACM profile ID in the coding and modulation information or in the demodulation and decoding information, it is unnecessary to look up an ACM profile table, so that ACM profile tables of the terminal for sending service information and the terminal for receiving service information may be switched during this period, and this switching may be asynchronous. In this way, the existing services are not affected during the switching of the ACM profile tables.

Figure 6:
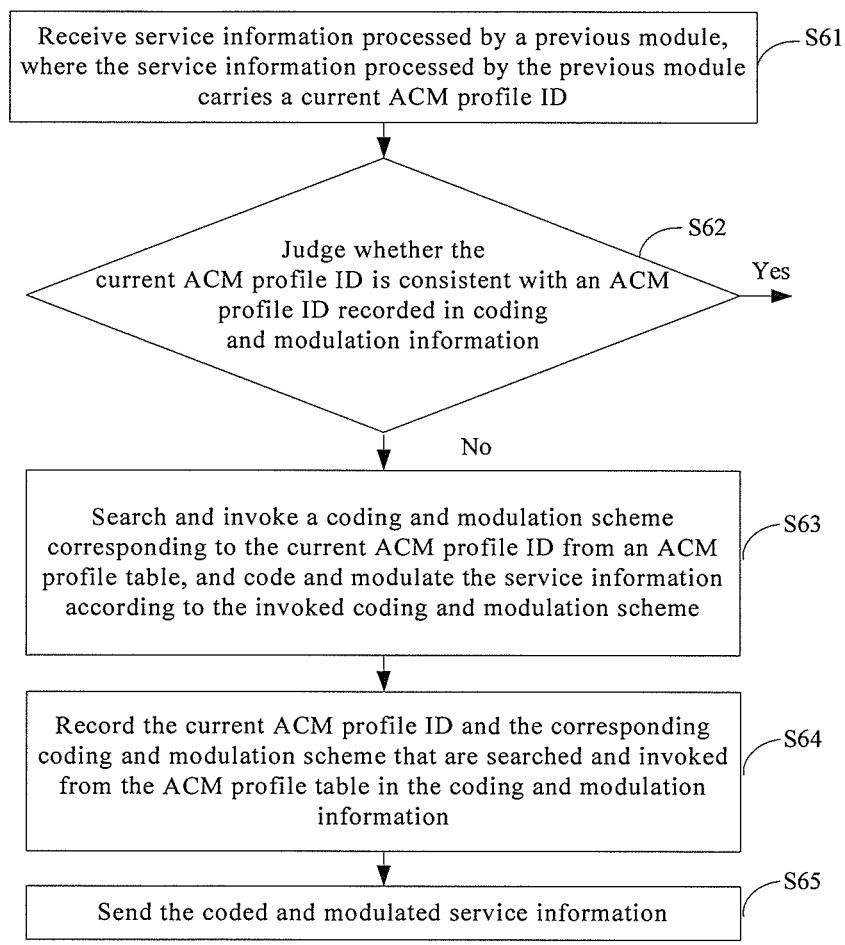
FIG. 6 is another detailed schematic diagram of the method for sending service information as shown in FIG. 2.

As shown in FIG. 6, the method for sending service information under a normal circumstance (that is, a circumstance without locking) in this embodiment is described in detail below. The method includes:

S61: Receive service information processed by a previous module, where the service information processed by the previous module carries a current ACM profile ID. For example, the current ACM profile ID may be profile ID 0.

S62: Judge whether the current ACM profile ID 0 is consistent with an ACM profile ID recorded in coding and modulation information, where the coding and modulation information records an ACM profile ID used for successfully sending service information last time and a corresponding coding and modulation scheme.

The ACM profile ID used for sending service information last time in this embodiment may be set to be profile ID 1. In this way, by comparing the current ACM profile ID and the ACM profile ID recorded in the coding and modulation information, it can be known that the current ACM profile ID is inconsistent with the ACM profile ID recorded in the coding and modulation information.

S63: Search and invoke a coding and modulation scheme corresponding to the current ACM profile ID 0 from an ACM profile table, and code and modulate the service information according to the invoked coding and modulation scheme.

The ACM profile table records multiple ACM profile IDs, such as profile ID 0 to profile ID 15, and coding and modulation schemes that have a one-to-one correspondence with the multiple ACM profile IDs respectively.

S64: Record the current ACM profile ID 0 and the corresponding coding and modulation scheme that are searched and invoked from the ACM profile table in the coding and modulation information to replace the ACM profile ID 1 used for sending service information last time and the corresponding coding and modulation scheme.

In this way, the ACM profile ID used for sending service information last time and the corresponding coding and modulation scheme are recorded in the coding and modulation information. It should be noted that step S64 may also be executed after step S65.

S65: Send the coded and modulated service information.

The coded and modulated service information carries the current ACM profile ID, so that the terminal for receiving service information demodulates and decodes the service information according to the current ACM profile ID.

Figure 7:
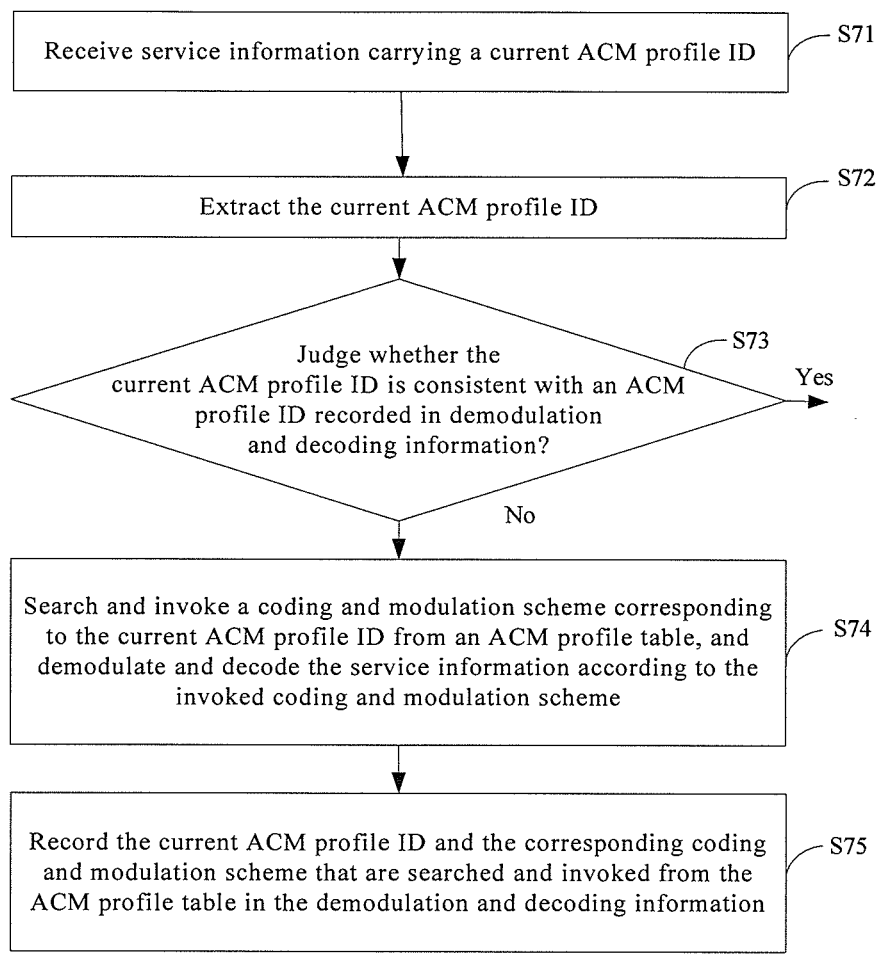
FIG. 7 is another detailed schematic diagram of the method for receiving service information as shown in FIG. 3.

As shown in FIG. 7, the method for receiving service information under a normal circumstance (that is, a circumstance without locking) in this embodiment is described in detail below. The method includes:

S71: Receive service information carrying a current ACM profile ID. The current ACM profile ID may be profile ID 0.

S72: Extract the current ACM profile ID. In this way, the current ACM profile ID is extracted from the service information to complete subsequent operation procedures, such as demodulation and decoding.

S73: Judge whether the current ACM profile ID 0 is consistent with an ACM profile ID recorded in separately-stored demodulation and decoding information, where the demodulation and decoding information records an ACM profile ID used for successfully receiving service information last time and a corresponding demodulation and decoding scheme.

Because the ACM profile ID recorded in the coding and modulation information in the embodiment as shown in FIG. 6 is set to be profile ID 1, and the information recorded in the demodulation and decoding information described in this embodiment should be the same as the information recorded in the coding and modulation in the embodiment as shown in FIG. 6, it can be known that the ACM profile ID recorded in the demodulation and decoding information in this embodiment is also the profile ID 1. In this way, by comparing the current ACM profile ID and the ACM profile ID recorded in the demodulation and decoding information, the current ACM profile ID is inconsistent with the ACM profile ID recorded in the demodulation and decoding information.

S74: Because a judging result in step S73 is that the current ACM profile ID is inconsistent with the ACM profile ID recorded in the demodulation and decoding information, search and invoke a coding and modulation scheme corresponding to the current ACM profile ID 0 from an ACM profile table, and demodulate and decode the service information according to the invoked coding and modulation scheme.

S75: Record the current ACM profile ID 0 and the corresponding demodulation and decoding scheme that are invoked from the ACM profile table in the demodulation and decoding information to replace the ACM profile ID 1 used for receiving service information last time and the corresponding demodulation and decoding scheme.

In this way, the ACM profile ID used for receiving service information last time and the corresponding demodulation and decoding scheme are recorded in the demodulation and decoding information.

It can be known from the embodiments shown in FIG. 6 and FIG. 7 that, when the ACM profile ID is not locked, the service information may also be sent and received smoothly.

Figure 8A:
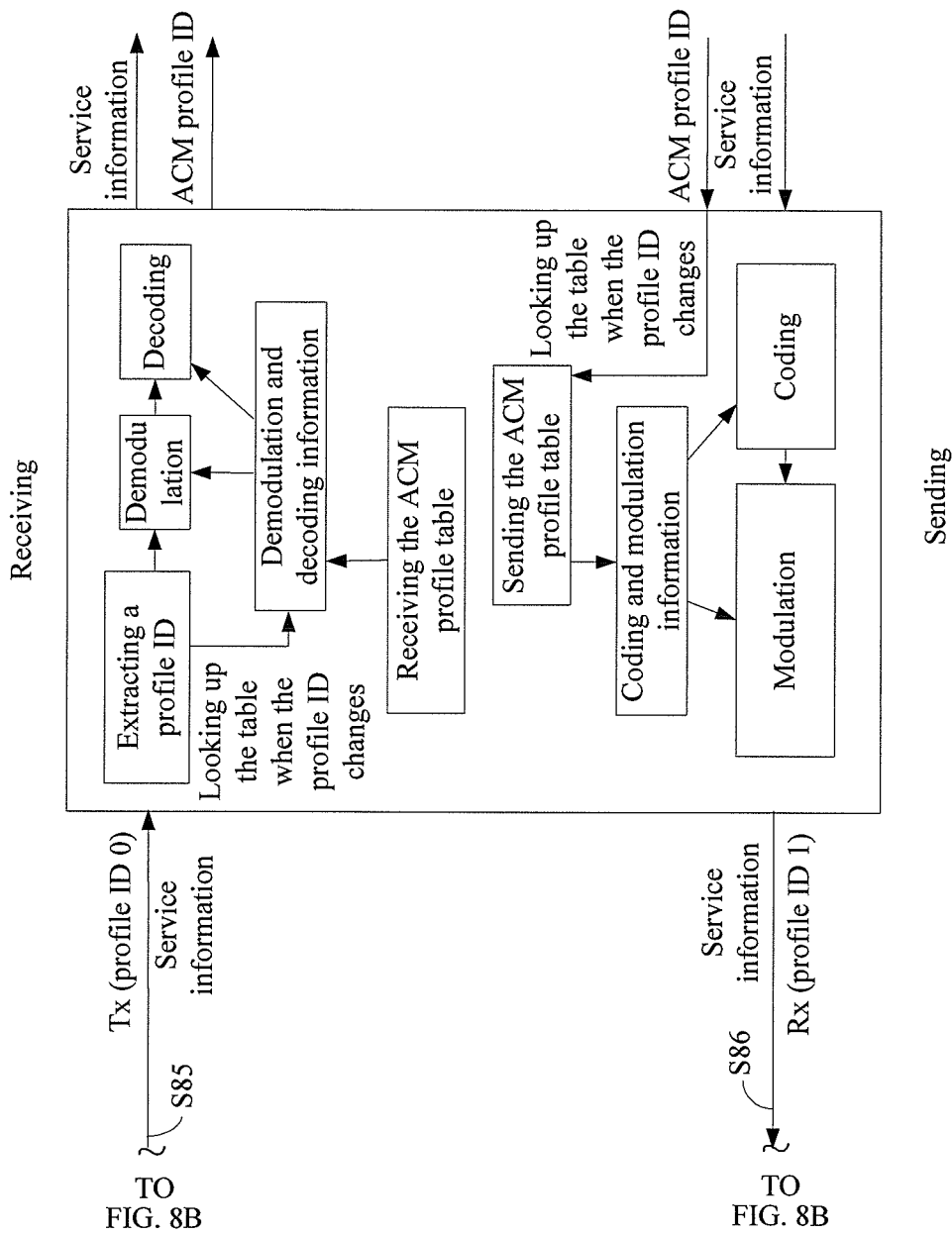
FIG. 8A and FIG. 8B are a schematic diagram of a method for receiving and sending service information according to an embodiment of the present invention.
Figure 8B:
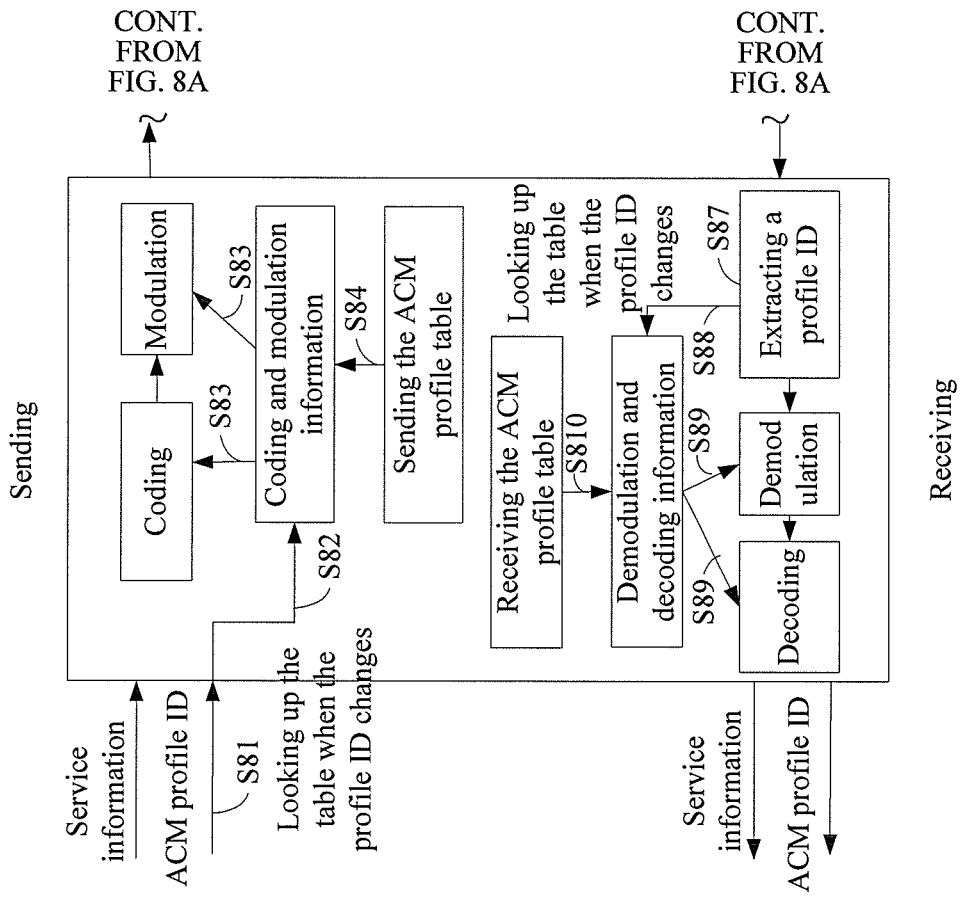

As shown in FIG. 8A and FIG. 8B, an embodiment of the present invention also provides a method for receiving and sending service information, where the method is applicable to a duplex terminal for receiving and sending service information. The method includes a method for sending service information and a method for receiving service information.

The method for sending service information includes:

S81: Receive a current ACM profile ID.

S82: Judge whether the current ACM profile ID is consistent with an ACM profile ID recorded in separately-stored coding and modulation information, where the coding and modulation information records an ACM profile ID used for successfully sending service information last time and a corresponding coding and modulation scheme.

S83: When the current ACM profile ID is consistent with the ACM profile ID recorded in the separately-stored coding and modulation information, code and modulate the service information according to the coding and modulation scheme recorded in the coding and modulation information.

S84: When the current ACM profile ID is inconsistent with the ACM profile ID recorded in the separately-stored coding and modulation information, search and invoke a coding and modulation scheme corresponding to the current ACM profile ID from a sending ACM profile table, and code and modulate the service information according to the invoked coding and modulation scheme.

S85: Send the coded and modulated service information, where the coded and modulated service information carries the current ACM profile ID.

The method for receiving service information includes:

S86: Receive service information carrying a current ACM profile ID.

S87: Extract the current ACM profile ID.

S88: Judge whether the current ACM profile ID is consistent with an ACM profile ID recorded in separately-stored demodulation and decoding information, where the demodulation and decoding information records an ACM profile ID used for successfully receiving service information last time and a corresponding demodulation and decoding scheme.

S89: When the current ACM profile ID is consistent with the ACM profile ID recorded in the separately-stored demodulation and decoding information, demodulate and decode the service information according to the demodulation and decoding scheme recorded in the demodulation and decoding information.

S810: When the current ACM profile ID is inconsistent with the ACM profile ID recorded in the separately-stored demodulation and decoding information, search and invoke a demodulation and decoding scheme corresponding to the current ACM profile ID from a receiving ACM profile table, and demodulate and decode the service information according to the invoked demodulation and decoding scheme.

It should be noted that the method in this embodiment applies to two duplex terminals for receiving and sending service information, and that each receiving and sending duplex terminal includes a sending ACM profile table and a receiving ACM profile table (that is, a dual-page structure). It should be ensured that the sending ACM profile table of one receiving and sending duplex terminal is the same as the receiving ACM profile table of another receiving and sending duplex terminal. However, in one receiving and sending duplex terminal, the sending ACM profile table and the receiving ACM profile table may not be completely the same, so that sending and receiving of an asymmetrical service may be supported.

Table 1 shows an example of a sending ACM profile table in a terminal.

TABLE 1

| Profile ID | Modulation Scheme | Code Rate | Puncturing Rate | Number of Code Blocks | Pilot Interval | Condition for Switching from Low Modulation to High Modulation MSE (dB) | Condition for Switching from High Modulation to Low Modulation MSE (dB) |
|---|---|---|---|---|---|---|---|
| 0 | QPSK | 0.75 | 780 | 4 | 50 | −20.5 | — |
| 1 | 16QAM | 0.75 | 660 | 8 | 50 | −23.5 | −17.5 |
| 2 | 64QAM | 0.75 | 480 | 8 | 32 | −31 | −24.5 |
| 3 | 128QAM | 0.75 | 480 | 8 | 34 | −33.6 | −30 |

Table 2 shows an example of a receiving ACM profile table in the same terminal.

TABLE 2

| Profile ID | Modulation Scheme | Code Rate | Puncturing Rate | Number of Code Blocks | Pilot Interval | Condition for Switching from Low Modulation to High Modulation MSE (dB) | Condition for Switching from High Modulation to Low Modulation MSE (dB) |
|---|---|---|---|---|---|---|---|
| 0 | QPSK | 0.75 | 480 | 4 | 50 | −19.5 | — |
| 1 | 16QAM | 0.75 | 660 | 8 | 50 | −23.5 | −17.5 |
| 2 | 32QAM | 0.75 | 492 | 10 | 50 | −28.5 | −22.5 |
| 3 | 64QAM | 0.75 | 480 | 8 | 32 | −31 | −24.5 |
| 4 | 128QAM | 0.75 | 480 | 8 | 34 | −33.6 | −30 |
| 5 | 256QAM | 0.75 | 492 | 8 | 26 | — | −32 |

The foregoing asymmetrical service may be applied to services such as an on-demand service and an Internet access service. For example, for the on-demand service, when one receiving and sending duplex terminal sends an on-demand instruction to another receiving and sending duplex terminal for a movie, the information volume of this on-demand instruction is generally small, but when the one receiving and sending duplex terminal receives the movie sent by the other receiving and sending duplex terminal, the information volume of the movie is generally large, thus causing an asymmetry of the received and sent service information. For the on-demand instruction, transmission of high reliability is generally required to ensure that no bit error or slip is caused, and thus ensure that the on-demand instruction can be executed smoothly. But for movie information, high transmission efficiency is required to transmit service information as much as possible. Therefore, different coding and modulation schemes are required for receiving and sending the service information. Therefore, in one receiving and sending duplex terminal, using a sending ACM profile table and a receiving ACM profile table that are not completely the same may implement the sending and receiving of an asymmetrical service.

Optionally, the method for sending service information and the method for receiving service information that are described in this embodiment of the present invention are applicable to a microwave transmission device. With the coding and modulation information (or the demodulation and decoding information) and the ACM profile tables that are described in this embodiment, the microwave transmission device can perform asynchronous configuration updating for the ACM profile tables without affecting normal services in practical applications.

Persons of ordinary skill in the art may understand that all or part of processes in the methods of the foregoing embodiments may be implemented by relevant hardware instructed by a computer program. The computer program may be stored in a computer readable storage medium, and when the computer program is executed, the processes of the embodiments of the foregoing methods may be included. The storage medium may be a magnetic disk, a compact disk, a read only memory (Read-Only Memory, ROM), or a random access memory (Random Access Memory, RAM).

Figure 9:
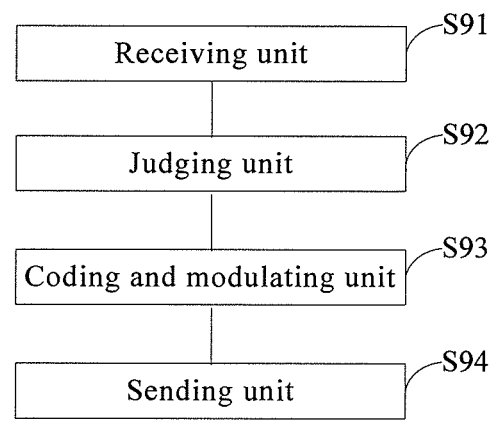
FIG. 9 is a schematic diagram of a terminal for sending service information according to an embodiment of the present invention.

As shown in FIG. 9, an embodiment of the present invention also provides a terminal for sending service information. The sending terminal includes:

a receiving unit 91, configured to receive a current ACM profile ID;

a judging unit 92, configured to judge whether the current ACM profile ID is consistent with an ACM profile ID recorded in separately-stored coding and modulation information, where the coding and modulation information records an ACM profile ID used for successfully sending service information last time and a corresponding coding and modulation scheme;

a coding and modulating unit 93, configured to, when the current ACM profile ID is consistent with the ACM profile ID recorded in the separately-stored coding and modulation information, code and modulate the service information according to the coding and modulation scheme recorded in the coding and modulation information, or when the current ACM profile ID is inconsistent with the ACM profile ID recorded in the separately-stored coding and modulation information, search and invoke a coding and modulation scheme corresponding to the current ACM profile ID from an ACM profile table, and code and modulate the service information according to the invoked coding and modulation scheme; and a sending unit 94, configured to send the coded and modulated service information, where the coded and modulated service information carries the current ACM profile ID.

In this embodiment, the current ACM profile ID is carried in service information processed by a previous module, and is sent together with the service information processed by the previous module, so that the receiving unit 91 is specifically configured to receive the service information processed by the previous module, where the service information processed by the previous module carries the current ACM profile ID.

Furthermore, it should be noted that in practical applications, the coding and modulating unit 93 in this embodiment may specifically include two independent modules, that is, a coding module and a modulating module respectively.

Figure 10:
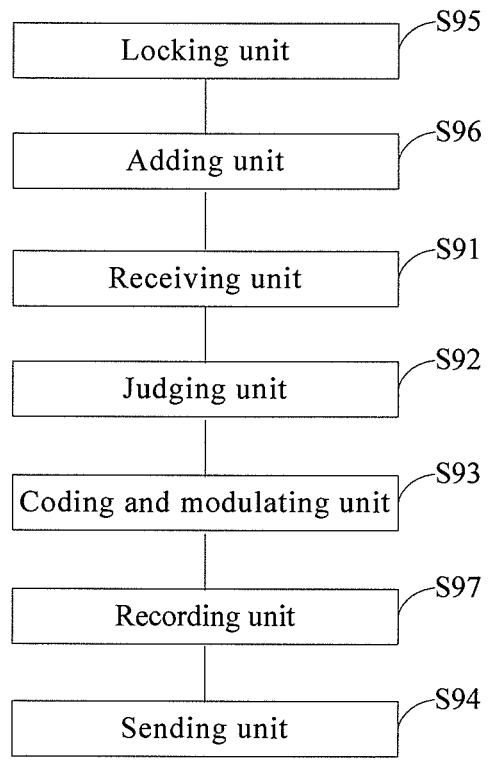
FIG. 10 is a detailed schematic diagram of the terminal for sending service information as shown in FIG. 9.

As shown in FIG. 10, the terminal for sending service information in this embodiment also includes:

a locking unit 95, configured to lock the ACM profile ID before the receiving unit 91 receives the service information processed by the previous module; and an adding unit 96, configured to add the locked ACM profile ID to preprocessed service information.

In addition, it can be known from FIG. 10 that, the terminal for sending service information also includes a recording unit 97, configured to record the current ACM profile ID and the corresponding coding and modulation scheme that are searched and invoked from the ACM profile table in the coding and modulation information to replace the ACM profile ID used for sending service information last time and the corresponding coding and modulation scheme. The coding and modulation information and the ACM profile table may be stored in different registers.

Figure 11:
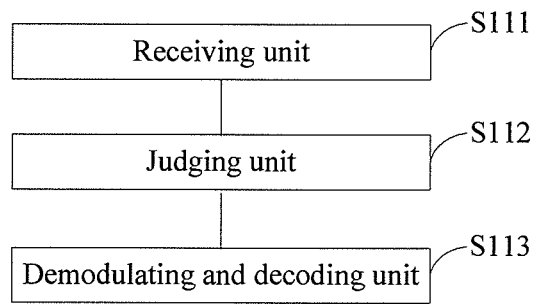
FIG. 11 is a schematic diagram of a terminal for receiving service information according to an embodiment of the present invention.

As shown in FIG. 11, an embodiment of the present invention also provides a terminal for receiving service information. The receiving terminal includes:

a receiving unit 111, configured to receive service information carrying a current ACM profile ID;

a judging unit 112, configured to judge whether the current ACM profile ID is consistent with an ACM profile ID recorded in separately-stored demodulation and decoding information, where the demodulation and decoding information records an ACM profile ID used for successfully receiving service information last time and a corresponding demodulation and decoding scheme; and a demodulating and decoding unit 113, configured to, when the current ACM profile ID is consistent with the ACM profile ID recorded in the separately-stored demodulation and decoding information, demodulate and decode the service information according to the demodulation and decoding scheme recorded in the demodulation and decoding information, or when the current ACM profile ID is inconsistent with the ACM profile ID recorded in the separately-stored demodulation and decoding information, search and invoke a demodulation and decoding scheme corresponding to the current ACM profile ID from an ACM profile table, and demodulate and decode the service information according to the invoked demodulation and decoding scheme.

Figure 12:
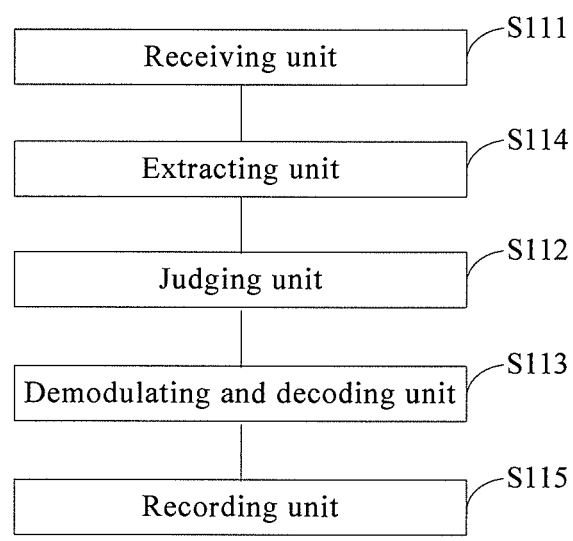
FIG. 12 is a detailed schematic diagram of the terminal for receiving service information as shown in FIG. 11.

As shown in FIG. 12, the terminal for receiving service information in this embodiment also includes:

an extracting unit 114, configured to extract the current ACM profile ID after the receiving unit receives the service information; and a recording unit 115, configured to record the current ACM profile ID and the corresponding demodulation and decoding scheme that are searched and invoked from the ACM profile table in the demodulation and decoding information to replace the ACM profile ID used for receiving service information last time and the corresponding demodulation and decoding scheme, where the demodulation and decoding information and the ACM profile table may be stored in different registers.

In the terminals for sending and receiving service information according to the embodiments of the present invention, when the current ACM profile ID is consistent with the ACM profile ID recorded in the coding and modulation information (or in the demodulation and decoding information), the service information is coded and modulated (or demodulated and decoded) according to the coding and modulation scheme (or the demodulation and decoding scheme) recorded in the coding and modulation information (or recorded in the demodulation and decoding information) without the need to access the ACM profile table. Therefore, the current ACM profile ID can be locked, and thus the ACM profile tables for receiving and sending service information may be switched asynchronously during a locking period.

Figure 13:
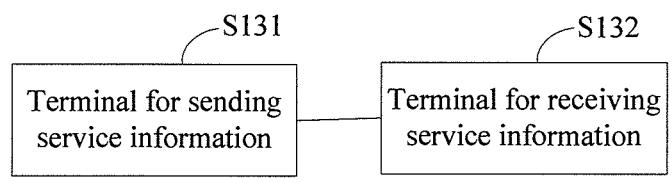
FIG. 13 is a schematic diagram of a system for receiving and sending service information according to an embodiment of the present invention.

As shown in FIG. 13, an embodiment of the present invention also provides a system for receiving and sending service information. The system includes:

a terminal 131 for sending service information, configured to receive a current ACM profile ID; judge whether the current ACM profile ID is consistent with an ACM profile ID recorded in separately-stored coding and modulation information, where the coding and modulation information records an ACM profile ID used for sending service information last time and a corresponding coding and modulation scheme; when the current ACM profile ID is consistent with the ACM profile ID recorded in the separately-stored coding and modulation information, code and modulate the service information according to the coding and modulation scheme recorded in the coding and modulation information, or when the current ACM profile ID is inconsistent with the ACM profile ID recorded in the separately-stored coding and modulation information, search and invoke a coding and modulation scheme corresponding to the current ACM profile ID from an ACM profile table, and code and modulate the service information according to the invoked coding and modulation scheme; and finally send the coded and modulated service information, where the coded and modulated service information carries the current ACM profile ID; and a terminal 132 for receiving service information, configured to receive the service information carrying the current ACM profile ID; judge whether the current ACM profile ID is consistent with an ACM profile ID recorded in separately-stored demodulation and decoding information, where the demodulation and decoding information records an ACM profile ID used for receiving service information last time and a corresponding demodulation and decoding scheme; when the current ACM profile ID is consistent with the ACM profile ID recorded in the separately-stored demodulation and decoding information, demodulate and decode the service information according to the demodulation and decoding scheme recorded in the demodulation and decoding information, or when the current ACM profile ID is inconsistent with the ACM profile ID recorded in the separately-stored demodulation and decoding information, search and invoke a demodulation and decoding scheme corresponding to the current ACM profile ID, and demodulate and decode the service information according to the invoked demodulation and decoding scheme.

In the system for receiving and sending service information according to the embodiment of the present invention, when the current ACM profile ID is consistent with the ACM profile ID recorded in the coding and modulation information (or in the demodulation and decoding information), the service information is coded and modulated (or demodulated and decoded) according to the coding and modulation scheme (or the demodulation and decoding scheme) recorded in the coding and modulation information (or recorded in the demodulation and decoding information) without the need to access the ACM profile table. Therefore, the current ACM profile ID can be locked, and thus the ACM profile tables for receiving and sending service information may be switched asynchronously during a locking period.

As shown in FIG. 8A and FIG. 8B, at a same end (for example, at a sending end, or a receiving end), the ACM profile table in this embodiment includes a sending ACM profile table and a receiving ACM profile table, and the sending ACM profile table and the receiving ACM profile table are not completely the same, so that the receiving and sending of an asymmetrical service are supported.

Described above are only exemplary embodiments of the present invention, but are not intended to limit the scope of the present invention. Any modification or replacement readily conceivable by persons skilled in the art within the technical scope disclosed in the present invention shall fall within the scope of the present invention. Therefore, the scope of the present invention is subject to the appended claims.

What is claimed is:

1. A method for sending service information, the method comprising:

asynchronously receiving, at a first terminal, service information and a current adaptive coding and modulation (ACM) profile identifier (profile ID) sent by a remote terminal;

judging whether the received current ACM profile ID is consistent with an ACM profile ID recorded in separately-stored coding and modulation information within the first terminal, wherein the separately-stored coding and modulation information comprises the recorded ACM profile ID which was used for successfully sending service information last time and a corresponding coding and modulation scheme;

when the received current ACM profile ID is consistent with the recorded ACM profile ID, coding and modulating the service information according to the coding and modulation scheme recorded in the coding and modulation information;

when the received current ACM profile ID is inconsistent with the recorded ACM profile ID, searching and invoking a coding and modulation scheme corresponding to the received current ACM profile ID from an ACM profile table stored in the first terminal, and coding and modulating the service information according to the invoked coding and modulation scheme; and sending the coded and modulated service information, wherein the coded and modulated service information carries the received current ACM profile ID.

2. The method for sending service information according to claim 1, wherein receiving the current ACM profile ID comprises:
receiving service information processed by a previous module, wherein the service information processed by the previous module carries the current ACM profile ID.

3. The method for sending service information according to claim 2, wherein before receiving the service information processed by the previous module, the method further comprises:
locking an ACM profile ID; and
adding the locked ACM profile ID to the service information processed by the previous module.

4. The method for sending service information according to claim 1, wherein after searching and invoking the coding and modulation scheme corresponding to the received current ACM profile ID from the ACM profile table, the method further comprises:
recording the received current ACM profile ID and the corresponding coding and modulation scheme that are searched and invoked from the ACM profile table in the coding and modulation information to replace the recorded ACM profile ID used for successfully sending service information last time and the corresponding coding and modulation scheme.

5. A terminal for sending service information, the terminal comprising:
a receiving unit, configured to asynchronously receive service information and a current adaptive coding and modulation (ACM) profile identifier (profile ID) from a remote terminal;
a judging unit, configured to judge whether the received current ACM profile ID is consistent with an ACM profile ID recorded in separately-stored coding and modulation information, wherein the separately-stored coding and modulation information comprises the recorded ACM profile ID which was used for successfully sending service information last time and a corresponding coding and modulation scheme;
a coding and modulating unit configured to:
when the received current ACM profile ID is consistent with the recorded ACM profile ID, code and modulate the service information according to the coding and modulation scheme recorded in the coding and modulation information, or
when the received current ACM profile ID is inconsistent with the recorded ACM profile ID, search and invoke a coding and modulation scheme corresponding to the received current ACM profile ID from an ACM profile table stored in the terminal, and code and modulate the service information according to the invoked coding and modulation scheme; and
a sending unit, configured to send the coded and modulated service information, wherein the coded and modulated service information carries the received current ACM profile ID.

6. The terminal for sending service information according to claim 5, wherein the receiving unit is configured to receive service information processed by a previous module, and the service information processed by the previous module carries the current ACM profile ID.

7. The terminal for sending service information according to claim 6, wherein the sending terminal further comprises:
a locking unit, configured to lock an ACM profile ID before the receiving unit receives the service information processed by the previous module; and
an adding unit, configured to add the locked ACM profile ID to the service information processed by the previous module.

8. The terminal for sending service information according to claim 5, wherein the sending terminal further comprises:
a recording unit, configured to record the received current ACM profile ID and the corresponding coding and modulation scheme that are searched and invoked from the ACM profile table in the coding and modulation information to replace the recorded ACM profile ID used for successfully sending service information last time and the corresponding coding and modulation scheme.

9. A method for sending service information from a terminal, the method comprising:
storing in the terminal a plurality of adaptive coding and modulation (ACM) profile identifiers (IDs) and a plurality of corresponding coding and modulation schemes in an ACM profile table;
separately storing in the terminal a first ACM profile ID and a corresponding first coding and modulation scheme, wherein the separately-stored first ACM profile ID and corresponding first coding and modulation scheme were used for successfully sending service information last time;
receiving service information and a current ACM profile ID;
judging whether the received current ACM profile ID is consistent with the separately-stored first ACM profile ID;
when a received current ACM profile ID is consistent with the separately-stored first ACM profile ID, coding and modulating the received service information according to the separately-stored current coding and modulation scheme;
when the received current ACM profile ID is inconsistent with the separately-stored first ACM profile ID, searching the ACM profile ID table for the received current ACM profile ID and coding and modulating the received service information with a corresponding coding and modulation scheme in the ACM profile table; and
sending the coded and modulated service information with the received current ACM profile ID.

* * * * *